United States Patent
Ludwig, Jr. et al.

Patent Number: 5,307,205
Date of Patent: Apr. 26, 1994

[54] BILAYER REAR PROJECTION SCREENS

[75] Inventors: Edward G. Ludwig, Jr., Mouans Sartoux, France; Patricia Maxson, North Wales; John A. Dorazio, Gwynedd Valley, both of Pa.

[73] Assignee: Rohm and Haas Company, Philadelphia, Pa.

[21] Appl. No.: 994,052

[22] Filed: Dec. 16, 1992

Related U.S. Application Data

[63] Continuation-in-part of Ser. No. 854,179, Mar. 20, 1992, abandoned.

[51] Int. Cl.$^5$ .............................................. G03B 21/60
[52] U.S. Cl. ........................................ 359/453; 359/460
[58] Field of Search ................ 359/443, 452, 453, 460

[56] References Cited

U.S. PATENT DOCUMENTS

| | | | |
|---|---|---|---|
| 3,679,451 | 7/1972 | Marks et al. | 359/452 X |
| 4,415,509 | 11/1983 | Toyuoka et al. | 264/13 |
| 4,679,900 | 7/1987 | McKechnie et al. | 359/452 |
| 5,170,287 | 12/1992 | Ludwig, Jr. et al. | 359/452 |

FOREIGN PATENT DOCUMENTS

| | | |
|---|---|---|
| 269324 | 1/1988 | European Pat. Off. |
| 342283 | 11/1989 | European Pat. Off. |
| 56-95640 | 8/1981 | Japan |
| 8811139 | 3/1988 | Japan |
| 8920729 | 4/1989 | Japan |

Primary Examiner—Richard A. Wintercorn
Attorney, Agent, or Firm—Roger K. Graham

[57] ABSTRACT

Efficient, lower weight, more versatile rear projection screens can be produced by combining in laminated form an unmodified clear matrix resin layer with a second sheet containing light diffusing polymer particles of specific size and size distribution.

12 Claims, 1 Drawing Sheet

BILAYER REAR PROJECTION SCREENS

This application is a continuation-in-part of application Ser. No. 854,179, filed Mar. 20, 1992, now abandoned.

BACKGROUND OF THE INVENTION

1. Field of the Invention

This invention relates to bilayer rear projection screens comprising a supporting polymeric layer and an adhered polymeric layer, preferably tinted, containing specific light diffusing particles.

2. Description of the Prior Art

In recent television technologies, the size of screens for Braun tubes is limited to the size of less than 50 inches even in large screen type televisions because the inside of a cathode ray tube is vacuum. A larger TV screen can be used in rear projected displays. There are two types of projected displays, a rear projected type and a front projected type. Slides are generally used with the front projected type and white cloth or white plastic screens are commonly used as screens thereof. When a translucent sheet is used, a rear projection screen can also be used in viewing slides.

EPC publication 269,324, Jun. 1, 1988 and EPC publication 342,283, Nov. 23, 1989 disclose a plastic translucent sheet with excellent light transmittance. Further use of light diffusing compositions as rear projection screens is also disclosed in these publications.

The performance of a rear projection screen is judged by the balance in characteristics of resolution, gain and contrast. The screen is required to provide sufficient resolution to be useful in data presentation by displaying sharp images. At the same time, the screen must diffuse the light in such a way as to allow a broad viewing audience angle. A gray tint is typically used to create contrast. This contrast is most noticeable when images on the screen are viewed in the presence of ambient light. Typical screens consist of a sheet of acrylic polymer, i.e., poly(methyl methacrylate), or glass, approximately 6 mm thick and are coated with a thin (<25 microns) layer of a light diffusing material. A neutral gray tint is sometimes added to the coating to provide improved contrast over screens without the tint.

The industry still seeks a light-weight, readily prepared, efficient rear projection screen with the specified light-scattering and transmission qualities.

SUMMARY OF THE INVENTION

We have found that a bilayer sheet constructed of a supporting polymeric, preferably thermoplastic, layer and a polymeric, preferably thermoplastic, preferably tinted, layer containing specific light diffusing particles provides a good balance of resolution, gain and contrast when used as a rear projection screen.

A single-layer sheet of ca. 5 mm. thickness containing an appropriate amount of the light-scattering particles defined herein will exhibit good diffusion of light at wide viewing angles, but will suffer somewhat in poor image resolution. Calculations based on the light-scattering behavior of small particles would have predicted that a bilayer structure wherein the particles were concentrated in the second thinner layer would have given diffusion equivalent to the optical behavior expected in a single matrix sheet with a distribution of a similar weight of particles and of equivalent overall thickness. Surprisingly, the bilayer sheet of the present invention offers advantages in resolution of images over the single-layer construction, and advantages in cost savings, ease of preparation and scratch resistance over conventional screens.

The composition and construction of the adhered bilayer sheets is described below.

DETAILED DESCRIPTION OF THE INVENTION AND THE PREFERRED EMBODIMENTS

Figure 1:
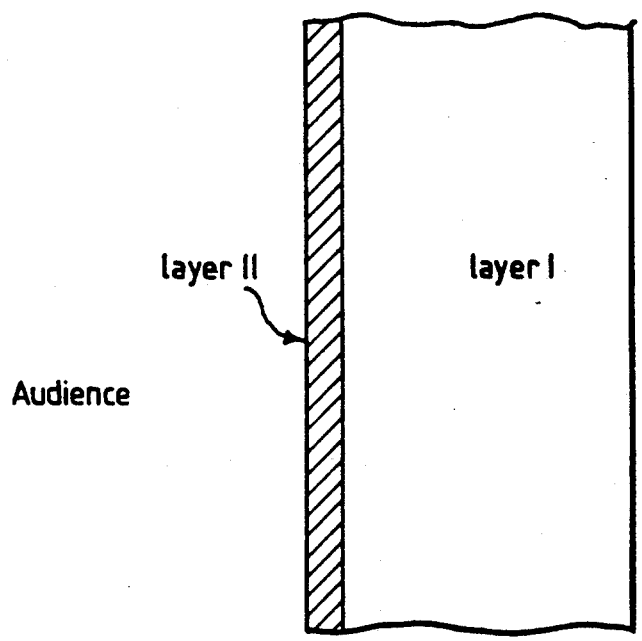

In both layers of the sheet, synthetic resins are used as matrices. Glass is not preferred because obtaining good adhesion of glass to the second layer containing the light-diffusing particles is not easy, and because glass adds to the weight of the composition. Examples of synthetic resins used herein include but are not limited to polyolefinic resins such as polyethylene and polypropylene, olefin-vinyl acetate copolymers, resins of poly(alkyl methacrylates) such as poly(methyl methacrylate), polyglutarimides, vinyl chloride resins, polyesters, polyamides, polycarbonate, polystyrene, styrene-acrylonitrile copolymers, polyvinylidene fluoride, polysulfones, and phenol type resins alone or in combination or as copolymers. The foregoing synthetic resins preferably have clarity, high modulus and heat resistance. Preferred are thermoplastics for ease for fabrication; of these are preferred poly(methyl methacrylate), polyglutarimide and polycarbonate for their balance of heat resistance, clarity, modulus and processability.

The first layer of the sheet is a synthetic resin of sufficient thickness and modulus to cause the sheet to be rigid at large sizes (2×3 meters). The second layer is a synthetic resin containing a specific light diffusing particle. The light diffusing particles may be mixed with and dispersed in the synthetic resin according to any known manner prior to production of the two-layer sheet. For instance, the following methods may be applied: (1) a method comprising kneading a synthetic resin and a light diffusing agent in an extruder and then forming the mixture into a sheet, (2) a method for forming a sheet according to a co-spray method; and (3) a method (disclosed in U.S. Pat. No. 3,751,527) comprising mixing an emulsion type synthetic resin and an emulsion containing particles of the light diffusing agent, coagulating both together utilizing coagulant and then molding a sheet. The second layer preferably also contains colorant or tint for the purpose of providing contrast. A neutral gray tint is preferred, such as one based on a dispersion of carbon black and toner. The tint can be added to the second layer simultaneously with the light diffusing particle, or can be added in a separate step. The level of tint used will be from about 50 to 200 ppm based on the matrix polymer, but levels higher or lower may be used depending on the specific characteristics of the colorant and the specific effect desired.

As one component of the composite of the present invention serves as the supportive matrix, the two layers, whether different or similar in composition, must be bonded together. Thus, it is necessary that the two layers adequately adhere to one another. Such can be determined by very simple external testing, such as compression molding plaques of the two layers together at conditions which approximate the conditions at which the two components are processed together. Adhesion may be accomplished by an adhesive, but at the probable cost of poorer optical properties.

The bilayer sheet may be manufactured according to any known manner. For instance, the following methods may be applied: 1) coextrusion, i.e., extruding melts from two separate extruders simultaneously through the same die, 2) lamination, i.e., compressing sheets of the two polymers together at elevated temperatures 3) casting acrylic onto sheet containing the light diffuser particle, i.e., adding monomer (preferably thickened with polymer) such as methyl methacrylate to the surface of the sheet and causing the monomer to polymerize. The latter method is not useful for polycarbonate or polyglutarimide as the second layer formed from monomer.

The thickness of the first layer is between 3 and 12 mm, preferably between 5 and 7 mm. The thickness of the second layer is between 0.25 and 1.25 mm, preferably between 0.4 and 0.8 mm.

The second layer of the sheet of the invention is characterized in that a light diffusing agent is contained in a matrix composed of one or more of the foregoing synthetic resins listed.

The light diffusing material used in the present invention is described below:

As the light diffusing agent, particles of an organic polymeric compound are preferred because of their proper light transmittance and excellent light diffusion properties. Specific examples thereof include alkyl (meth)acrylate type resins, monovinylarene type resins such as styrene type resins and vinyl carboxylate resins. These light diffusing agents may be homopolymers, copolymers or mixtures as well as multi-staged polymeric materials. Preferred are alkyl acrylate type resins and more preferably used are those comprising a core of such alkyl acrylate resins which are further covered with layers of the foregoing resins. Examples of the latter are polymer particle compositions as disclosed in EPC publications 269,324 and 342,283 and in allowed U.S. application Ser. No. 679,411, herein incorporated by reference.

The light diffusing agent particles used are in general substantially spherical in shape and their average particle size ranges from 0.1 to 500 microns. The term "average particle size" is herein referred to that determined by a Nanosizer. Moreover, the particles preferably have a particle size distribution in which the particle size of at least 90% by weight of the particles falls within the range of the average particle size of ±20%. The refractive index ($n_D$) of the light diffusing agent preferably has the following correlation with the refractive index of the foregoing matrix synthetic resin ($n_M$) in view of obtaining good diffusion properties:

$$0.003 \leq |n_M - n_D| \leq 0.2$$

(the term "refractive index" herein means ($n_D^{25}$)).

The aforesaid light diffusing particles are incorporated into the foregoing synthetic resin (matrix) in an amount ranging from 0.1 to 40% by weight. These particles are preferably dispersed in the matrix uniformly whereby good light diffusion properties would be achieved.

Particularly preferred materials which comprise synthetic resins and light diffusing particles mixed and dispersed therein are polymer compositions as disclosed in the above-identified EPC publications. More specifically, the polymer compositions are thermoplastic or thermosetting polymer compositions which comprise thermoplastic or thermoset matrix polymers and light diffusing polymer particles dispersed in the matrix in an amount ranging from 0.1 to 40% by weight on the basis of the total weight of the composition, the polymer particles having an average particle size ranging from 2 to 15 microns and a particle size distribution in which the particle size of at least 90% by weight of the particles falls within the range of the average particles size ±20% and the particles being substantially spherical in shape. When the polymer composition is a light scattering composition based on a thermoplastic polymer matrix and the spherical polymer particles constitute 15 to 35% by weight of the total weight of the composition, particularly preferred spherical polymer particles are core/shell polymer particles composed of a core of a rubber-like alkyl acrylate polymer (wherein the alkyl group has 2 to 8 carbon atoms) which is copolymerized with up to 5% of a cross-linking agent and/or with up to 5% of a graft linker (the amount is based on the total weight of the core) and whose refractive index $n_D^{25}$ is in the range of that of the matrix polymer ($n_M$)±0.2, preferably out of the range of the refractive index ($n_M$)±0.003; and at least one polymer shell (the outermost layer) is compatible with the matrix polymer and where the shell(s) constitute 5 to 40% of the weight of the particle.

Other polymers of appropriate particle size, shape, and particle size distribution, including those prepared by alternate methods of modified emulsion or suspension technology, which function as light diffusers in, e.g., a methacrylic polymer matrix may also be used in the present invention.

FIG. 1 represents a side view of a rigid rear projection screen for television. Layer I is the supporting plastic layer and comprises poly(methyl methacrylate). Layer II is the layer containing the light diffusing layer and comprises poly(methyl methacrylate) as the matrix. Layer II faces the audience. The thickness of layer I is 6.35 mm and the thickness of layer II is 0.5 mm.

Figure 2:
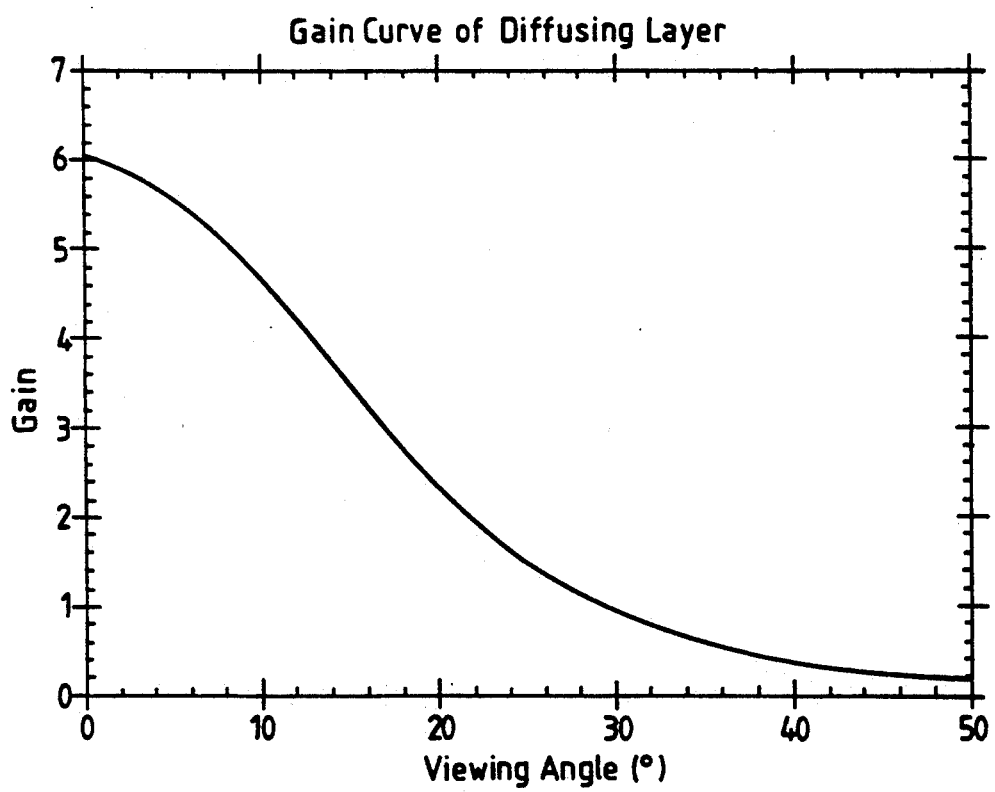

FIG. 2 represents the gain curve of layer II of FIG. 1. The gain has been measured relative to a BaSO4 standard. The measurement is made with a photogoniometer designed to measure light output of a sample from 0° to 90° from the incident light. The curve represents the desired optical results; a gain is greater than one at and beyond 25°–30°, representing an improved uniformity of projected image over a wide audience viewing angle.

Light diffusing polymer composition sheet used in the example described above is prepared as follows.

| (1) Manufacturing example of light diffusing polymer particles. | |
|---|---|
| Components | Amount parts by weight(pbw) |
| Mixture A | |
| Water | 162 |
| Potassium carbonate | 0.12 |
| Mixture B | |
| Butyl acrylate | 66 |
| Styrene | 15 |
| n-Octyl mercaptan | 19 |
| 10% Aqueous solution of sodium dodecylbenzene-sulfonate | 5.3 |
| Water | 9 |
| Mixture C | |
| Potassium persulfate | 0.014 |
| Water | 1.4 |
| Mixture D | |
| Potassium persulfate | 0.014 |
| Water | 8.3 |

Step A

Mixture A was charged into a reactor provided with a stirrer and a condenser and blanketed with nitrogen gas and heated to 87° C.

To the stirred reactor contents there were added 7% of the mixture B and all of the mixture C and the contents were stirred for 30 minutes. Thereafter, the remaining mixture B and the mixture D were added to the contents over 90 minutes with stirring. The contents of the reactor were maintained at 87° C. for 50 minutes with stirring, then the resultant Step A polymer emulsion was cooled to room temperature.

The particle size of the resultant polymer (butyl acrylate-styrene copolymer) particles contained in the Step A polymer emulsion was determined by a Nanosizer and was found to be about 0.3 micron.

Step B

Furthermore, the following mixtures was prepared:

| (1) Manufacturing example of light diffusing polymer particles. | |
|---|---|
| Components | Amount (pbw) |
| Mixture A | |
| Butyl acrylate | 98 |
| Butylene glycol diacrylate | 0.50 |
| Alkyl methacrylate | 2.0 |
| Benzoyl peroxide | 0.80 |
| Mixture B | |
| Magnesium p-nitrosophenolate | 0.011 |
| Water | 226 |
| 10% Aqueous solution of sodium dodecylbenzenesulfonate | 3.1 |
| Mixture C | |
| Step A polymer emulsion | 1.5 |

Mixtures A and B were admixed with each other in a Waring Blender for 3 minutes to obtain an emulsion. This emulsion was introduced into a pressure reactor to which 1.5 pbw of Mixture C Step A polymer emulsion had been charged and the contents of the reactor were stirred for one hour under a nitrogen blanket. The reactor was sealed, was shaken at 68° C. for 3 hours in a water bath and then cooled to room temperature. The resultant Step B polymer emulsion contained a polymer having a particle size of about 2 microns.

Step C

The procedure of aforementioned Step B was repeated, except that 23 pbw of the Step B emulsion polymer was used rather than Step A polymer emulsion. The polymer particles in the Step C polymer emulsion had a diameter of approximately 5 microns.

Step D

The following mixture was prepared:

| (1) Manufacturing example of light diffusing polymer particles. | |
|---|---|
| Components | Amount (pbw) |
| Mixture A | |
| Step C polymer emulsion | 1348 |
| Mixture B | |
| Methyl methacrylate | 96 |
| Ethyl acrylate | 4.0 |
| Mixture C | |
| 3% Aqueous sodium formaldehyde sulfoxylate | 10 |

| (1) Manufacturing example of light diffusing polymer particles. | |
|---|---|
| Components | Amount (pbw) |
| 10% Aqueous sodium dodecylbenzene-sulfonate | 1.5 |
| Water | 53 |
| Mixture D | |
| t-Butyl hydroperoxide | 0.45 |
| Water | 14 |

Mixture A (Step C polymer emulsion) was weighed into a reactor equipped with a stirrer and a condenser and blanketed with nitrogen. The reactor contents were heated to 85° C. and stirred under the nitrogen blanket, Mixtures B, C and D were separately added to the reactor over a period of 90 minutes. The temperature was maintained at 55° C. and stirring was continued for 30 minutes, after which the reactor contents were cooled to room temperature. The resulting particles in the Step D polymer emulsion were about 5 microns in diameter, with less than about 20% by weight of particles less than about 5 microns in diameter.

The light diffusing agent (multi-stage polymer) thus prepared has a refractive index ($n_D^{25}$) of 1.46.

(2) Preparation of a light diffusible resin composition

The light diffusing agent obtained in Step D above was coagulated with a calcium hypophosphite coagulant to isolate it from an aqueous dispersion and 5 parts by weight of the light diffusing resin agent was melt-blended at 232° C. with 20 parts by weight of a synthetic matrix resin. In this example a poly(methyl methacrylate) resin molding powder having a weight-average molecular weight of about 120,000 was the matrix resin.

The refractive index ($n_D^{25}$) of poly(methyl methacrylate) used herein as the matrix for the surface layer was 1.49.

(3) Preparation of sheet

Prepared light diffusible resin composition was extruded into sheet of 0.5 mm thickness by using an extruder. Conditions are those recommended for extrusion of thin acrylic sheet, viz., for Plexiglas® 044, a polymer essentially of methyl methacrylate with a "weight-average molecular weight ca. 135,000". Typical conditions would be barrel temperatures of 182°-243° C. at the rear zone, 204°-249° C. in the center and front zones, and 204°-232° C. at the die. The sheet is cut to size and laminated under heat and pressure to a clear acrylic sheet, which may be of the same matrix material absent in the light diffusing additive of thickness ca. 6 mm.

If appropriate extruders are available feeding to an appropriate co-extrusion die, a similar sheet may be formed by one of ordinary skill in the art after appropriate adjustments to the extrusion rates of the matrix resin and the additive-containing resin. Detailed manuals for extrusion and co-extrusion are readily available to the extruder artisan from manufacturers of acrylic resins; an example is Plexiglas extrusion manual PL-32 g, available from Rohm and Haas Plastics Sales, Independence Mall West, Philadelphia, Pa. 19105. The light-diffusing additive has relatively little effect on the processing of its blend.

The following describes how co-extrusion may be accomplished. The light diffusing additive described above is blended (25 parts per 100 parts acrylic matrix) with pellets of a commercial acrylic molding powder, methyl methacrylate/ethyl acrylate 99/1, MW ca.

150,000. The same acrylic polymer is also used as the non-modified substrate. By co-extrusion with a 36" (0.91 meters) width setting, a layer of the modified acrylic polymer(25 mil, 0.64 mm.) is formed contiguous to the matrix polymer (0.25 inches, 6.3 mm). As the additive increases the melt viscosity of the acrylic polymer/additive blend, somewhat higher extrusion temperatures are required to match the extrusion rates of the two polymer sheets. Excellent adhesion between the two layers is observed. Visual observation confirms that the diffusion of light observed is similar to that of a single sheet with the diffusing additive dispersed throughout.

A toughened analog may be prepared in a similar manner by using a commercial clear toughened acrylic molding powder as both the non-modified substrate and the matrix polymer for the blend. Such toughed polymers will contain an impact modifier which is a core/shell polymer of a cross-linked butyl acrylate/styrene rubber to which is grafted methyl methacrylate, the core/shell polymer having a refractive index carefully matched to the acrylic molding powder to be toughened.

What is claimed:

1. An article comprising a bilayer sheet for use as a rear projection screen which comprises a first synthetic resin layer and an adhered synthetic resin layer containing light diffusing polymeric particles, the particles being substantially spherical, having a diameter from about 2 to about 15 microns, and a size distribution such that 90% of the particles are within ±20% of the average particle diameter, the bilayer sheet being formed by the process comprising: co-extruding the first synthetic resin and the second synthetic resin from two extruders simultaneously through the same sheet-forming die in such a manner that they contact to form an adhered bilayer co-extruded sheet.

2. An article comprising a bilayer sheet for use as a rear projection screen which comprises a first synthetic resin layer and an adhered synthetic resin layer containing light diffusing polymeric particles, the particles being substantially spherical, having a diameter from about 2 to about 15 microns, and a size distribution such that 90% of the particles are within ±20% of the average particle diameter, the bilayer sheet being formed by the process comprising: forming separately sheets of each resin layer, followed by pressing such sheets together under heat and pressure to form an adhered bilayer sheet.

3. The article of claim 1 or 2 further comprising at least one colorant.

4. The article of claim 3 wherein the light diffusivity of the polymer particles is superior to that of the matrix polymer, and the polymer particles have a refractive index within about t±0.2 units of, but no closer than about ±0.003 units to, the refractive index of the synthetic resin matrix, the synthetic resin matrices of both layers are poly(methyl methacrylate), and the colorant level is between 50 to 200 ppm based on the matrix resin.

5. The article of claims 1 or 2 wherein the sheet is used as a screen in a rear projection system.

6. The article of claims 1 or 2 wherein the synthetic resin of each layer comprises a thermoplastic polymer and wherein the polymer of the second layer contains from about 0.1% to about 40% of the total composition by weight of spherical polymer particles.

7. The article of claim 6 wherein the light diffusivity of the polymer particles is superior to that of the matrix polymer and the polymer particles have a refractive index within about ±0.2 units of, but no closer than about ±0.003 units to, the refractive index of the synthetic resin matrix.

8. The article of claim 6 wherein the synthetic resin matrices of both layers are poly(methyl methacrylate).

9. The article of claims 1 or 2 wherein the light diffusing polymer particles comprise a rubbery alkyl acrylate copolymer, the alkyl group having from 2 to 8 carbon atoms, and wherein the copolymerizable monovinyl monomer comprises styrene.

10. The article of claim 9 wherein the alkyl acrylate copolymer is surrounded by one or more shells, the outer shell of which is compatible with the matrix polymer, and which comprises from about 5 to about 40% of the weight of the particles.

11. The article of claim 10, wherein the synthetic resin matrices of both layers are poly(methyl methacrylate).

12. The article of claims 1 or 2 wherein the thickness of the first layer is between 5 to 7 mm and the thickness of the second layer is between 0.25 and 1.25 mm.

* * * * *